April 5, 1966     A. R. CARLSON     3,244,989

OSCILLOSCOPE SWEEP CIRCUITS

Filed Aug. 13, 1963

INVENTOR
ALAN R. CARLSON
BY
ATTORNEY 3,244,989
OSCILLOSCOPE SWEEP CIRCUITS
Alan R. Carlson, Palo Alto, Calif., assignor to Hewlett-Packard Company, Palo Alto, Calif., a corporation of California
Filed Aug. 13, 1963, Ser. No. 301,732
2 Claims. (Cl. 328—185)

This invention relates to sweep circuits of the type used in sampling oscilloscopes.

The sweep circuit of a sampling oscilloscope should provide horizontal displacement of successive samples of the waveform under examination. One known sweep circuit provides horizontal displacement of successive samples as a function of the number of recurrences of the waveform under examination rather than as a function of time. This provides a trace of uniformly spaced samples independent of the periodicity of the recurring waveform. A sweep circuit of this type is described in U.S. Patent 3,010,071, issued on November 21, 1961, to A. R. Carlson. This circuit has the disadvantage that only one sample is taken per recurrence (or selected number or recurrences) of the waveform. Thus for slowly recurring waveforms and slow sweep rates the horizontal deflection of successive samples occurs at a perceptively slow rate and hence the oscilloscope trace does not appear as a steady display.

Accordingly, it is an object of the present invention to provide an improved sweep circuit for a sampling oscilloscope which is suited for operation on slowly recurring waveforms and at slow sweep rates and which provides multiple samples of the waveform during a single recurrence thereof.

In accordance with the illustrated embodiment of the present invention a ramp signal is initiated during a selected recurrence of the input signal. A comparator receives the ramp signal and a staircase signal and produces a trigger pulse when the two signals are equal. A staircase generator is actuated by the trigger pulses from the comparator to produce a staircase signal as a function of the number of these trigger pulses produced by the comparator. The steps of the staircase signal have uniform amplitude and are substantially smaller than the total excursion of the ramp signal. As a result, a plurality of trigger pulses are produced during the period of the ramp signal as the ramp is compared with successive increases in the staircase signal. A sample of the waveform under examination is obtained for each trigger pulse occurring during a single recurrence of the waveform under examination. Higher density sampling on slowly recurring signals is thus obtained.

Other and incidental objects of the present invention will be apparent from a reading of this specification and an inspection of the accompanying drawing in which.

Figure 1:
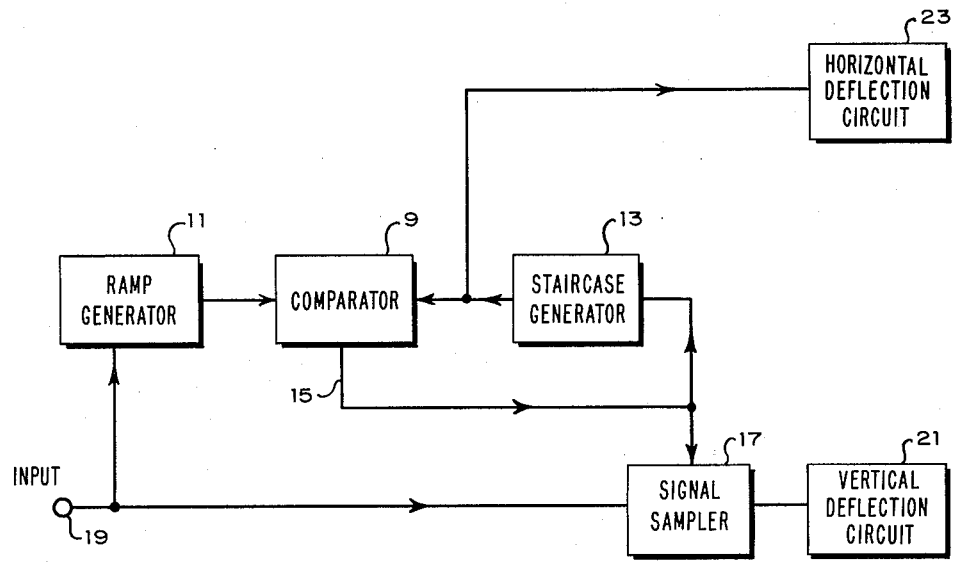
FIGURE 1 is a block diagram of the sweep circuit of the present invention.

Referring now to FIGURE 1 there is shown a comparator 9 connected to receive the output of a ramp generator 11 and the output of a staircase generator 13. The comparator 9 produces a trigger pulse at the output 15 whenever these input signals are equal and then resets prior to the next occurrence of coincidence of the two signals. Staircase generator 13 receives these trigger pulses and produces an increment or step in its output for each trigger pulse received. Thus, as the ramp signal increases a trigger pulse is produced each time the ramp signal and a successive increment or step of the staircase signal are equal. A plurality of trigger pulses are thus produced in this manner during the period of the ramp signal. These trigger pulses are also applied to the signal sampler 17 which produces a sample pulse having an amplitude which is related to the instantaneous value of the waveform appearing at the input terminal 19. These sample pulses are applied to a vertical deflection circuit 21 of an oscilloscope or oscillographic recorder and the staircase signal produced by the staircase generator 13 is applied to the horizontal deflection circuit 23 of the same device. The ramp signal produced by generator 11 is initiated at each recurrence of the waveform appearing at input terminal 19. The period of the ramp signal is at least as long as the portion of the input waveform which is desired to be displayed.

Figure 2:
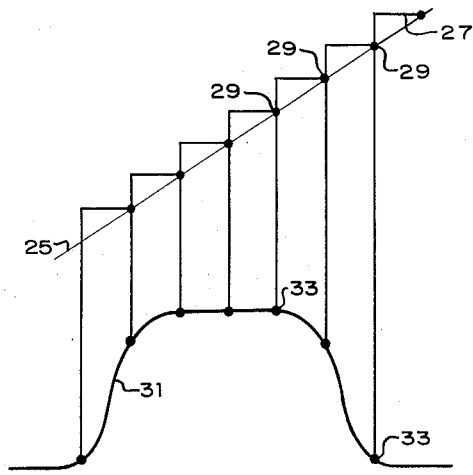
FIGURE 2 is a graph showing the relationships of signals present in the circuit of FIGURE 1.

Referring to the graph of FIGURE 2, a ramp signal 25 is compared with the staircase signal 27. At each of the coincidence points 29 along these waveforms a sample pulse is taken of the waveform 31 under examination. These sample pulses are displayed on the face of an oscilloscope and are represented in FIGURE 2 as sample points 33. Thus, a plurality of samples may be taken of the waveform under examination during a single recurrence of such a waveform. This renders the sweep circuit more useful for examination of extremely slowly recurring waveforms and particularly for examining non-recurring events.

I claim:

1. A signalling circuit for operation on an input signal, said circuit comprising:
   a generator for producing a staircase signal as a function of the number of trigger pulses applied thereto;
   a comparator having an output connected to said generator and adapted to produce said trigger pulses in response to signals applied to the inputs thereof attaining a predetermined relationship to each other;
   means producing a ramp signal for each selected recurrence of said input signal, the amplitude excursion of said ramp signal being greater than the amplitude of a plurality of steps of said staircase signal;
   and means connected to the inputs of said comparator for applying said ramp and staircase signals thereto to produce a plurality of trigger pulses during the excursion of said ramp signal.

2. An oscilloscope sweep circuit comprising:
   a generator for producing a staircase signal as a function of the number of trigger pulses applied thereto;
   a comparator having an output connected to said generator and adapted to produce said trigger pulses in response to the equality of signals applied to the inputs thereof and further adapted to reset prior to a successive occurrence of equality of said signals;
   means producing a ramp signal for each selected recurrence of said input signal, the amplitude excursion of said ramp signal being greater than the amplitude of a plurality of steps of said staircase signal;
   and means connected to the inputs of said comparator for applying said ramp and staircase signals thereto to produce a plurality of trigger pulses during the excursion of said ramp signal.

References Cited by the Examiner
UNITED STATES PATENTS

| | | | |
|---|---|---|---|
| 2,449,467 | 9/1948 | Goodall | 328—186 |
| 2,845,597 | 7/1958 | Perkins | 328—147 |
| 2,924,712 | 2/1960 | Edens | 307—88.5 |
| 3,003,111 | 10/1961 | Smith | 328—185 |

ARTHUR GAUSS, *Primary Examiner.*
R. EPSTEIN, *Assistant Examiner.*